United States Patent
Ohtake

(10) Patent No.: US 7,369,123 B2
(45) Date of Patent: May 6, 2008

(54) PANEL UNIT CAPABLE OF AVOIDING CONTACT BETWEEN ELECTRICALLY CONDUCTIVE BODIES THEREON

(75) Inventor: Seiji Ohtake, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 559 days.

(21) Appl. No.: 10/985,904

(22) Filed: Nov. 12, 2004

(65) Prior Publication Data
US 2006/0012578 A1    Jan. 19, 2006

(30) Foreign Application Priority Data
Jul. 14, 2004    (JP)    ............................. 2004-206728

(51) Int. Cl.
*G09G 5/00*    (2006.01)
(52) U.S. Cl. ................................................ 345/173
(58) Field of Classification Search ............... 345/173, 345/156; 178/18.01–18.11
See application file for complete search history.

(56) References Cited
U.S. PATENT DOCUMENTS
6,529,188 B1 *    3/2003    Suzuki .................... 345/173
2004/0027340 A1 *    2/2004    Muraoka et al. ............ 345/173

FOREIGN PATENT DOCUMENTS
JP    08-241646    9/1996
JP    2001-249766    9/2001
JP    2001-296971    10/2001

* cited by examiner

*Primary Examiner*—Amare Mengistu
*Assistant Examiner*—Grant D. Sitta
(74) *Attorney, Agent, or Firm*—Arent Fox LLP

(57) ABSTRACT

A first electrically conductive stripe extends from a starting point to an end point on the front surface of a lower base member in a panel unit. An upper base member is designed to oppose its back surface to the front surface of the lower base member. A second electrically conductive stripe extends on the back surface of the upper base member from a corresponding starting point opposed to the starting point to a corresponding end point opposed to the end point. The second electrically conductive stripe intersects across the first electrically conductive stripe two or more times. When an urging force is applied on the upper base member, the second electrically conductive body is urged toward the first electrically conductive body. Contact is surely prevented between the first and second electrically conductive stripes. The panel unit is thus allowed to normally keep operating.

15 Claims, 6 Drawing Sheets

PANEL UNIT CAPABLE OF AVOIDING CONTACT BETWEEN ELECTRICALLY CONDUCTIVE BODIES THEREON

BACKGROUND OF THE INVENTION

1. Field of the Invention

The present invention relates to a panel unit such as a touch screen panel unit, for example.

2. Description of the Prior Art

A so-called analog resistive touch screen panel unit includes a glass substrate and a resin film opposing the back surface to the front surface of the glass substrate. Indium-tin oxide (ITO) films are formed to spread over the front surface of the glass substrate and the back surface of the resin film, respectively. Electrically conductive lines extend adjacent the peripheries of the ITO films along the peripheries of the glass substrate and resin film, respectively. The electrically conductive lines are in this manner opposed to each other. An adhesive layer is interposed between the electrically conductive lines on the glass substrate and resin film so as to adhere the resin film to the glass substrate. The electrically conductive lines and the adhesive layer are located off an window opening defined in an enclosure of a display apparatus, for example.

A user of a notebook personal computer often grasps the enclosure at a position off the window opening. The resin film is forced to receive an urging force from the enclosure. The adhesive layer is squashed between the electrically conductive lines. Since the electrically conductive lines are constantly opposed to each other, the electrically conductive lines tends to contact with each other. If the electrically conductive lines contact each other, the touch screen panel unit cannot normally operate.

One of the electrically conductive lines may be entirely displaced off the other of the electrically conductive lines so as to avoid the aforementioned contact of the electrically conductive lines. In this case, the adhesive layer slides off from a predetermined position when the resin film receives an urging force. In addition, a larger area is required around the window opening to locate the electrically conductive lines. This contradicts a recent trend of reducing an area around the window opening.

SUMMARY OF THE INVENTION

It is accordingly an object of the present invention to provide a panel unit capable of avoiding contact between electrically conductive bodies to the utmost.

According to a first aspect of the present invention, there is provided a panel unit comprising: a lower base member; a stripe of a first electrically conductive body extending from a starting point to an end point on the front surface of the lower base member; an upper base member opposing its back surface to the front surface of the lower base member; and a stripe of a second electrically conductive body extending on the back surface of the upper base member from a corresponding starting point opposed to the starting point to a corresponding end point opposed to the end point, said second electrically conductive body intersecting across the first electrically conductive body two or more times.

When an urging force is applied on the upper base member in the panel unit, the second electrically conductive body is urged toward the first electrically conductive body. Since the second electrically conductive body intersects across the first electrically conductive body two or more times, the lap can to the utmost be reduced between the first and second electrically conductive bodies. Contact is surely prevented between the first and second electrically conductive bodies. The panel unit is thus allowed to normally keep operating. In this case, the first electrically conductive body may serpentine on the front surface of the lower base member. Likewise, the second electrically conductive body serpentines on the back surface of the upper base member. The lower and upper base members may have permeability of light.

The panel unit may further include: a frame member received on the front surface of the upper base member, said frame member defining a window opening along the front surface of the upper base member; and an insulator layer interposed between the first and second electrically conductive bodies, said insulator layer receiving an urging force acting on the upper base member from the frame member. Here, the first electrically conductive body may extend along the periphery of the lower base member.

The user often grasps the periphery of the panel unit. A larger urging force is applied to the upper base member from the frame member. The urging force causes the second electrically conductive body to be urged toward the first electrically conductive body. In this case, the second electrically conductive body intersects across the first electrically conductive body two or more times, so that the lap is to the utmost reduced between the first and second electrically conductive bodies. Contact is surely prevented between the first and second electrically conductive bodies. The panel unit thus keeps normally operating.

In addition, when the urging force is received on the upper base member from the frame member, the second electrically conductive body is urged toward the first electrically conductive body. Since the second electrically conductive body intersects across the first electrically conductive body two or more times, a lateral shift can be prevented between the first and second electrically conductive bodies along the surfaces of the upper and lower base members. The panel unit may be assembled into a display apparatus, an electronic apparatus, or the like. The display apparatus, the electronic apparatus, or the like may further include a display panel unit, in addition to the panel unit of the first aspect. In this case, the lower base member may be located along the front surface of the display panel unit.

According to a second aspect of the present invention, there is provided a first base member; an electrically conductive film extending on the front surface of the first base member between a pair of electrode; an electrically conductive line connected to at least one of the electrodes, said electrically conductive line extending from a starting point to an end point on the front surface of the first base member at a location spaced from the electrically conductive film; a second base member opposing the back surface to the front surface of the first base member; and a stripe of an electrically conductive body extending on the back surface of the second base member from a corresponding starting point opposed to the starting point to a corresponding end point opposed to the end point, said electrically conductive body intersecting across the electrically conductive line two or more times.

When an urging force is applied on the second base member in the panel unit, the electrically conductive body is urged toward the electrically conductive line. Since the electrically conductive body intersects across the electrically conductive line two or more times, the lap can to the utmost be reduced between the electrically conductive body and the electrically conductive line. Contact is surely prevented between the electrically conductive body and the electrically conductive line. The panel unit is thus allowed to normally keep operating. In this case, the electrically conductive body may be an electrode connected to an electrically conductive film extending on the back surface of the second base member at a position opposed to the electrically conductive film on the first base member. The first and second base members may have permeability of light.

The panel unit may further include: a frame member received on the front surface of the second base member, said frame member defining a window opening along the front surface of the second base member; and an insulator layer interposed between the electrically conductive body and the electrically conductive line, said insulator layer receiving an urging force acting on the second base member from the frame member. Here, the electrically conductive body may extend along the periphery of the second base member.

The user often grasps the periphery of the panel unit. A larger urging force is applied to the second base member from the frame member. The urging force causes the electrically conductive body to be urged toward the electrically conductive line. In this case, the electrically conductive body intersects across the electrically conductive line two or more times, so that the lap is to the utmost reduced between the electrically conductive body and the electrically conductive line. Contact is surely prevented between the electrically conductive body and the electrically conductive line. The panel unit thus keeps normally operating.

In addition, when the urging force is received on the second base member from the frame member, the electrically conductive body is urged toward the electrically conductive line. Since the electrically conductive body intersects across the electrically conductive line two or more times, a lateral shift can be prevented between the electrically conductive body and the electrically conductive line along the surfaces of the first and second base members. The panel unit maybe assembled into a display apparatus, an electronic apparatus, or the like. The display apparatus, the electronic apparatus, or the like may further include a display panel unit, in addition to the panel unit of the second aspect. In this case, the first base member may be located along the front surface of the display panel unit.

BRIEF DESCRIPTION OF THE DRAWINGS

The above and other objects, features and advantages of the present invention will become apparent from the following description of the preferred embodiment in conjunction with the accompanying drawings, wherein.

DESCRIPTION OF THE PREFERRED EMBODIMENT

Figure 1:
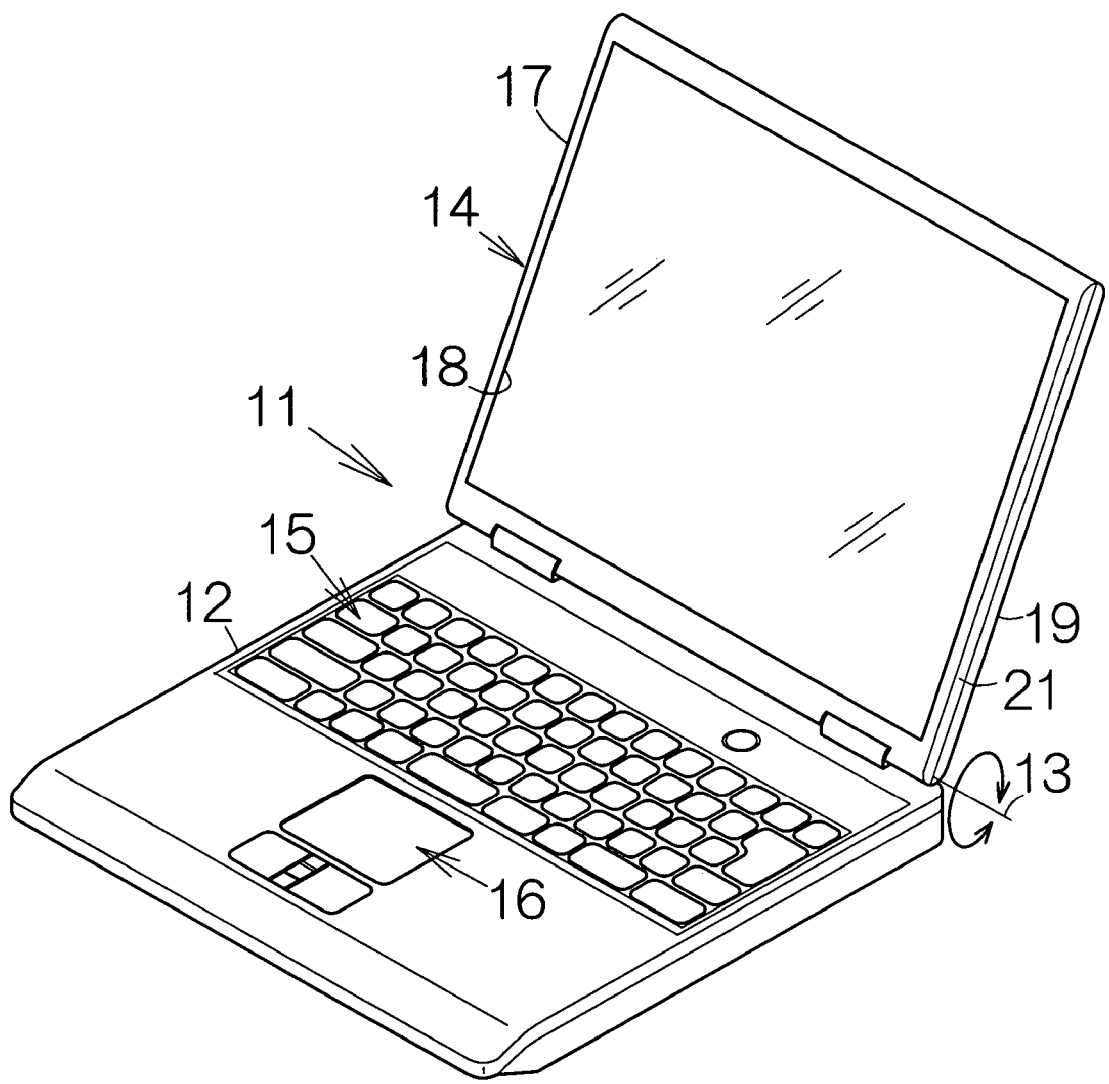
FIG. 1 is a perspective view schematically illustrating the entire structure of a notebook personal computer as a specific example of an electronic apparatus.

FIG. 1 schematically illustrates a notebook personal computer 11 as a specific example of an electronic apparatus. The notebook personal computer 11 includes a thin equipment body 12 and a display apparatus 14 coupled to the equipment body 12 for a relative swinging movement around a predetermined rotation axis 13.

A motherboard, not shown, is contained within the enclosure of the equipment body 12. As conventionally known, a processing circuits such as a central processing unit (CPU) and a memory, for example, are mounted on the motherboard. The CPU serves to operate based on an operating system (OS) and application softwares temporality stored in the memory. The user is allowed to input various data and instructions to the CPU through input devices such as a keyboard 15, a pointing device 16, and the like.

The display apparatus 14 includes a display enclosure 17. A rectangular window opening 18 is defined in the display enclosure 17. The window opening 18 serves to expose the screen of a liquid crystal display (LCD) panel. Graphics and texts can be displayed on the screen of the LCD panel based on the operation of the CPU.

Figure 2:
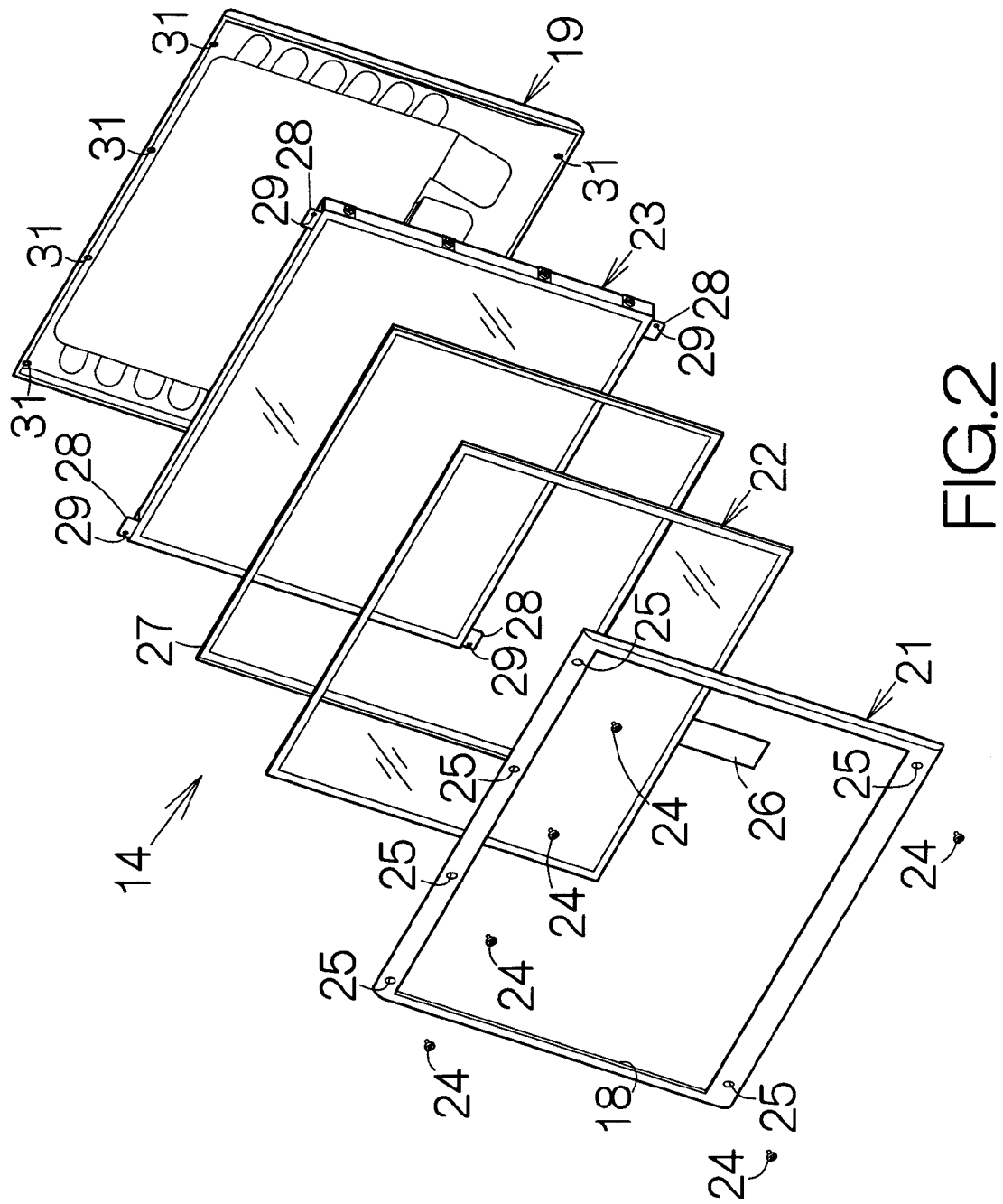
FIG. 2 is an exploded view schematically illustrating the assembly of a touch screen panel unit and a liquid crystal display (LCD) panel unit attached to a cover and a base.

As shown in FIG. 2, the display enclosure 17 includes a base 19 and a cover 21 coupled to the base 19. The cover 21 serves as a frame member. The cover 21 and the base 19 may be made from resin material such as polycarbonate, metal material such as magnesium, or the like. Molding process may be employed to form the cover 21 and the base 19. A touch screen panel unit 22 is contained within a space defined between the cover 21 and the base 19. The space between the cover 21 and the base 19 also contains a LCD panel unit 23 superposed on the back surface of the touch screen panel unit 22. The touch screen panel unit 22 have at least permeability of light or transparency.

Screws 24 are screwed into the display enclosure 17 so as to couple the cover 21 with the base 19. The axes of the screws 24 are aligned in the direction perpendicular to the screen of the display apparatus 14. The screws 24 are inserted from the front surface of the cover 21. Penetrating holes 25 are defined in the cover 21 so as to receive the insertion of the respective screws 24. The penetrating holes 25 may be covered with a dressed material, not shown, for example.

The touch screen panel unit 22 includes a flexible printed circuit (FPC) board 26 extending toward the equipment body 12. The flexible printed circuit board 26 is connected to the motherboard within the equipment body 12. A controller circuit such as a controller chip, not shown, is mounted on the motherboard. The controller circuit serves to control the operation of the touch screen panel unit 22.

Panel-shaped module components such as a LCD panel, a diffuser, a prism plate, a light guide plate, a reflector are in this sequence superposed on one another in the LCD panel unit 23. Two fluorescent tubes are disposed adjacent the lower end of the light guide plate, for example. A circuit board is disposed behind the reflector for controlling the display. The circuit board is interposed between front and back insulating sheets. A flexible printed circuit board is connected to the circuit board. The flexible printed circuit board is connected to the motherboard within the equipment body 12.

A spacer 27 is interposed between the touch screen panel unit 22 and the LCD panel unit 23. The spacer 27 includes a surrounding that surrounds the outer periphery of the touch screen panel unit 22. The back surface of the spacer 27 is received on the front surface of the LCD panel unit 23. The spacer 27 may be made of any elastic material such as rubber. The spacer 27 serves to keep a predetermined space between the touch screen panel unit 22 and the LCD panel unit 23.

Protruding tongues 28 are defined in the LCD panel unit 23. The protruding tongues 28 are designed to extend outward from the outer periphery of the LCD panel unit 23. Penetrating holes 29 are defined in the protruding tongues 28 to receive the insertion of the screws 24. On the other hand, screwed bores 31 are formed in the base 19 so as to receive the insertion of the screws 24. The screws 24 are received in the screwed bores 31 after the screws 24 have penetrating through the cover 21 and the protruding tongue 28. The touch screen panel unit 22 and the LCD panel unit 23 are in this manner fixed between the cover 21 and the base 19.

Figure 3:
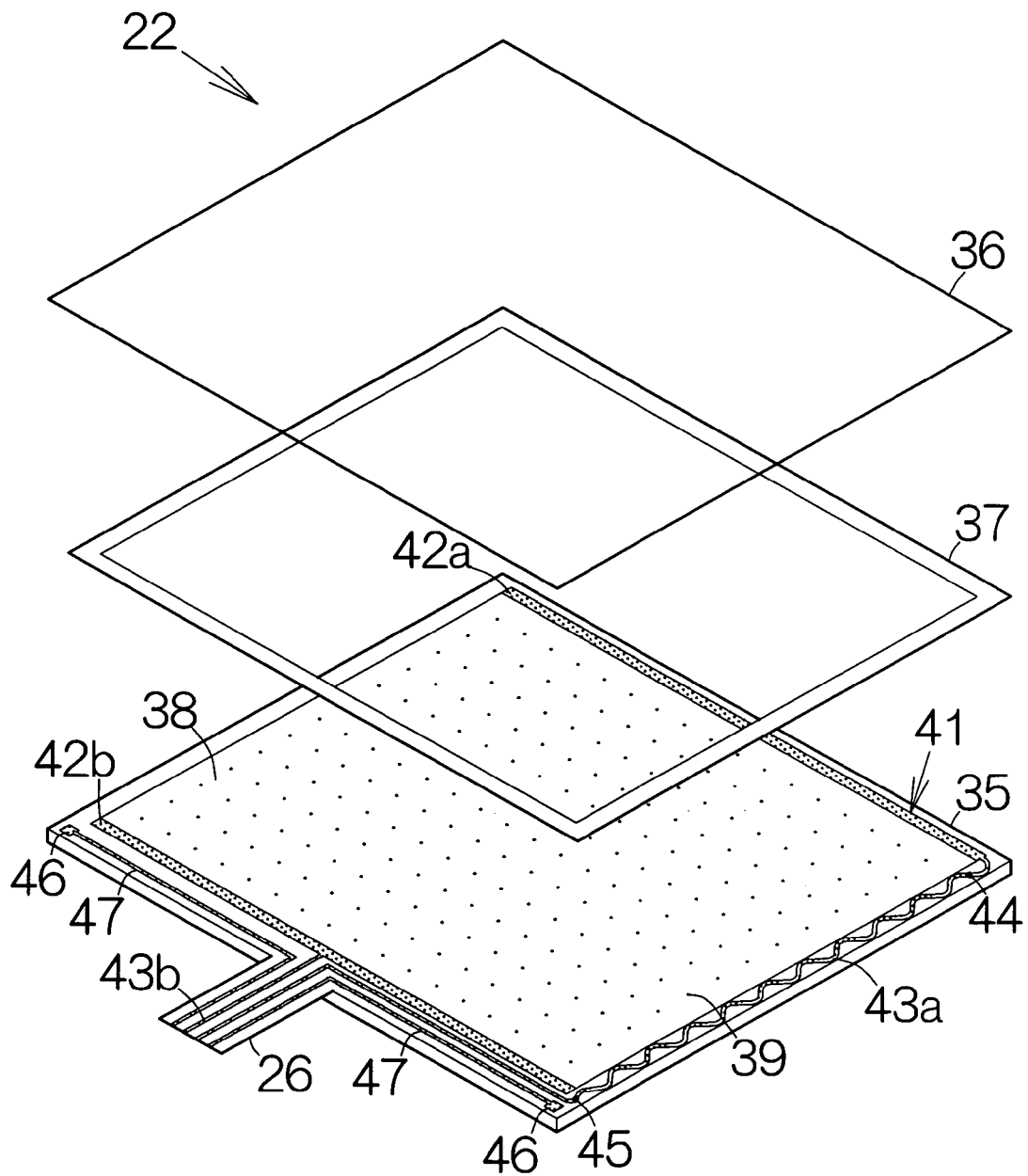
FIG. 3 is an exploded view schematically illustrating the structure of a touch screen panel unit.

As shown in FIG. 3, the touch screen panel unit 22 includes a rectangular first base member or lower base member 35, and a rectangular second base member or upper base member 36 opposing the back surface to the front surface of the lower base member 35. The lower base member 35 may be made of a transparent glass substrate, for example. The lower base member 35 thus has permeability of light. The upper base member 36 may be made of a transparent resin film such as polyethylene terephthalate (PET) film, for example. The upper base member 36 thus has permeability of light. The upper base member 36 has a contour identical to that of the lower base substrate 35. An adhesive material 37 is interposed between the lower and upper base members 35, 36. The adhesive material 37 forms a frame extending along the outer periphery of the lower and upper base members 35, 36. The adhesive material 37 serves to fixedly couple the periphery of the upper base member 36 with the periphery of the lower base member 35.

Figure 4:
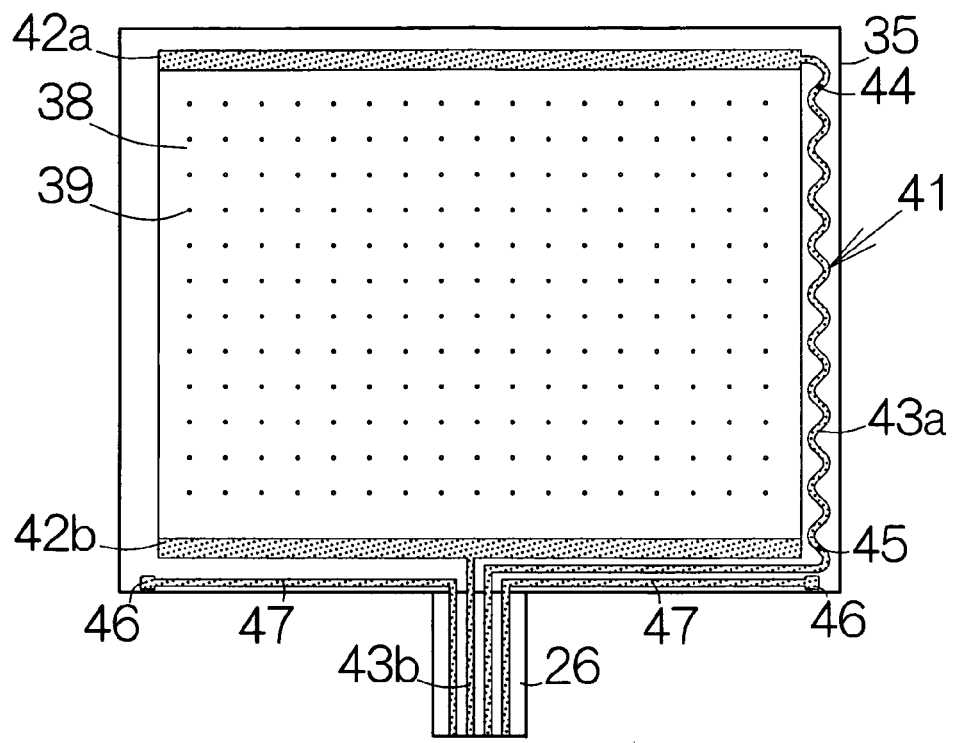
FIG. 4 is a plan view of a lower base member according to a specific example.

Referring also to FIG. 4, a transparent first electrically conductive film 38 extends over the front surface of the lower base member 35. The first electrically conductive film 38 has a rectangular shape. The front surface of the lower base member 35 is exposed around the first electrically conductive film 38. The first electrically conductive film 38 may be made of an indium-tin oxide (ITO) film, for example. Dot spacers 39 are located on the upper surface of the first electrically conductive film 38 at positions equally spaced. The dot spacers 39 are arranged according to a lattice. The dot spacer 39 is a hemisphere swelling from the upper surface of the first electrically conductive film 38. The dot spacers 39 may be made of a resin material having an insulating property, for example.

A first electrically conductive body 41 extends on the front surface of the lower base member 35 along the outer periphery of the lower base member 35. The first electrically conductive body 41 includes a pair of first electrode 42a, 42b and a pair of first electrically conductive line 43a, 43b. The first electrodes 42a, 42b are individually connected to the first electrically conductive film 38. The first electrically conductive lines 43a, 43b are separately connected to the first electrodes 42a, 42b, respectively. The first electrodes 42a, 42b extend along the longer sides of the rectangular first electrically conductive film 38. The first electrically conductive film 38 thus extends between the first electrodes 42a, 42b. The first electrically conductive line 43a extends toward the flexible printed circuit board 26 at a location spaced from the first electrically conductive film 38. The first electrically conductive line 43a first extends along the shorter side of the rectangular first electrically conductive film 38. The first electrically conductive line 43a then extends in parallel with the first electrode 42b. The first electrically conductive line 43a serpentines along a straight line connecting a starting point 44 and an end point 45. The first electrically conductive line 43b likewise extends toward the flexible printed circuit board 26 at a location spaced from the first electrically conductive film 38. The first electrodes 42a, 42b and the first electrically conductive lines 43a, 43b may be made of a metal material such as silver, copper, or the like.

A pair of first electrically conductive pads 46, 46 are formed on the front surface of the lower base member 35 at locations spaced form the first electrically conductive film 38, the first electrodes 42a, 42b and the first electrically conductive lines 43a, 43b. An electrically conductive line 47 is connected to the first electrically conductive pad 46. The electrically conductive line 47 extends on the front surface of the lower base member 35 at a location spaced from the first electrodes 42a, 42b and the first electrically conductive lines 43a, 43b. The electrically conductive line 47 is directed to the flexible printed circuit board 26. The first electrically conductive pads 46 and the electrically conductive lines 47 may be made of a metal material such as silver, copper, or the like.

Figure 5:
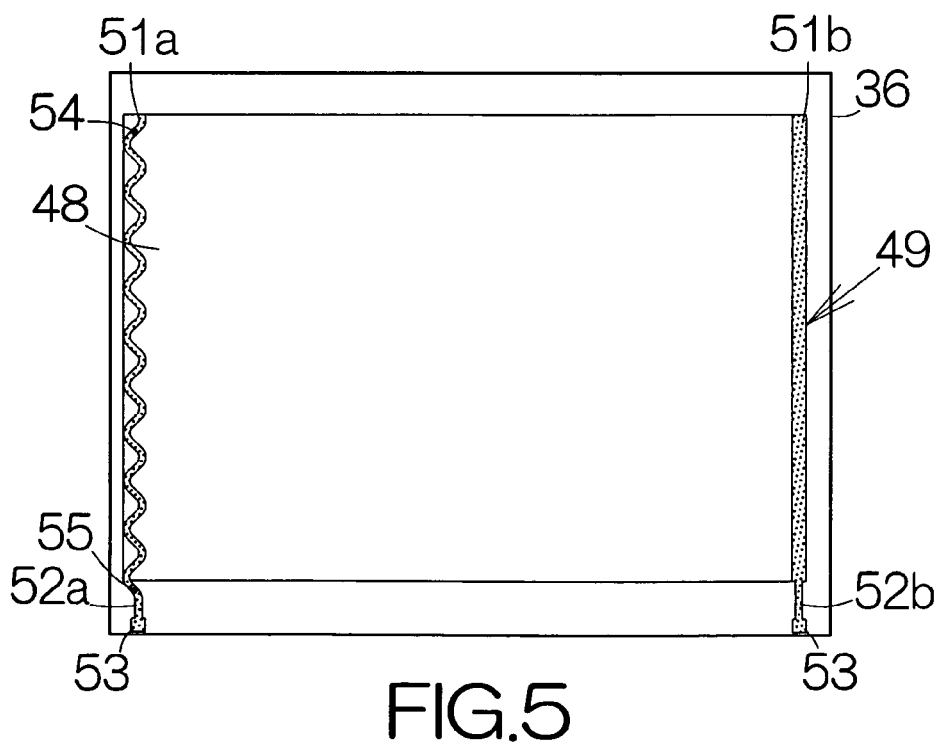
FIG. 5 a plan view of an upper base member according to a specific example.

Referring also to FIG. 5, a transparent second electrically conductive film 48 extends over the back surface of the upper base member 36. The second electrically conductive film 48 has a rectangular shape. The back surface of the upper base member 36 is exposed around the second electrically conductive film 48. The second electrically conductive film 48 is located at a position opposed to the first electrically conductive film 38. The second electrically conductive film 48 may be made of an indium-tin oxide (ITO) film, for example.

A second electrically conductive body 49 extends on the back surface of the upper base member 36 along the outer periphery of the upper base member 36. The second electrically conductive body 49 includes a pair of second electrode 51a, 51b and a pair of second electrically conductive line 52a, 52b. The second electrodes 51a, 51b are individually connected to the second electrically conductive film 48. The second electrically conductive lines 52a, 52b are separately connected to the second electrodes 51a, 51b, respectively. The second electrodes 51a, 51b extend along the shorter sides of the rectangular second electrically conductive film 48. The second electrically conductive film 48 thus extends between the second electrodes 51a, 51b. The second electrode 51a serpentines along a straight line connecting a starting point 54 and an end point 55. The starting point 54 is opposed to the starting point 44 of the first electrically conductive line 43a. The end point 55 is opposed to the end point 45 of the first electrically conductive line 43a.

The ends of the second electrically conductive lines 52a, 52b are connected to the second electrically conductive pads 53, 53. The second electrically conductive pads 53 are located on the back surface of the upper base member 36 at positions spaced from the second electrically conductive film 48 and the second electrodes 51a, 51b. The second electrodes 51a, 51b, the second electrically conductive lines 52a, 52b and the second electrically conductive pads 53 may be made of a metal material such as silver, copper, or the like. When the lower base member 35 is coupled with the upper base member 36 with the aforementioned adhesive material 37, the individual second electrically conductive pads 53, 53 are connected to the corresponding first electrically conductive pads 46, 46, respectively. The second electrically conductive pads 53, 53 are thus connected to the electrically conductive lines 47, 47 on the lower base member 35.

Figure 6:
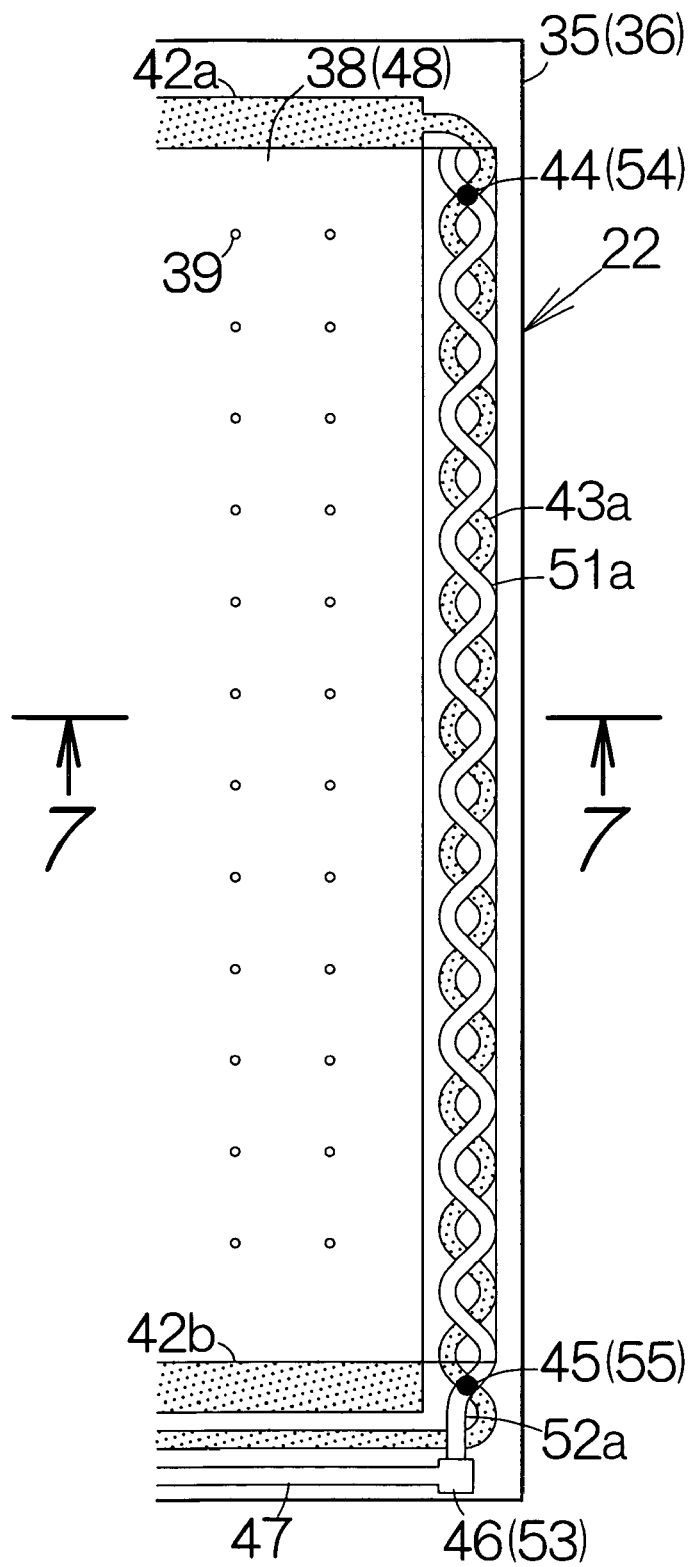
FIG. 6 is an enlarged partial plan view schematically illustrating the structure of the touch screen panel unit.

As shown in FIG. 6, when the upper base member 36 is placed on the lower base member 35, the straight line connecting the starting point 44 and the end point 45 is aligned with the straight line connecting the starting point 54 and the end point 55. The second electrode 51a intersects across the first electrically conductive line 43a two or more times between the starting point 54 and the end point 55. The lap is reduced between the first electrically conductive line 43a and the second electrode 51a to the utmost. Here, the second electrode 51a crosses the first electrically conductive line 43a at equal intervals.

Figure 7:
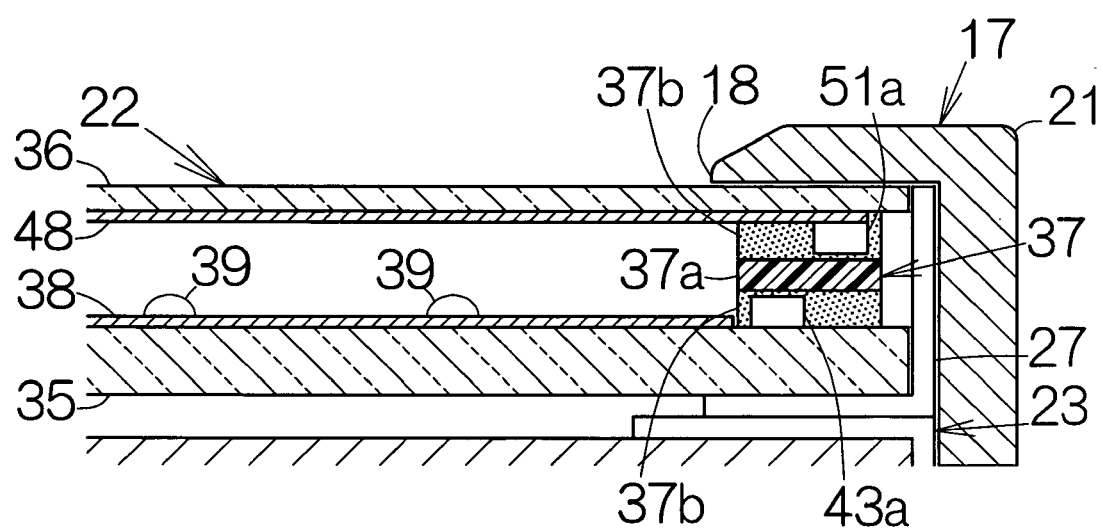
FIG. 7 is a sectional view taken along the line 7-7 in FIG. 6, for schematically illustrating the structure of the touch screen panel unit.

As shown in FIG. 7, when the touch screen panel unit 22 is incorporated within the display enclosure 17, the lower base member 35 is located along the front surface of the LCD panel unit 23. The front surface of the upper base member 36 receives the cover 21. The window opening 18 of the cover 21 is thus arranged on the front surface of the upper base member 36. The electrically conductive line 43a and the second electrode 51a are located off the window opening 18.

As described above, the adhesive material 37 is interposed between the first electrically conductive line 43a and the second electrode 51a. The adhesive material 37 may be an insulating double-sided adhesive sheet serving as an insulator layer. The adhesive material 37 serves to insulate the electrically conductive line 43a from the second electrode 51a. The adhesive material 37 includes a substrate 37a and adhesive layers 37b formed on the front and back surfaces of the substrate 37a. The substrate 37a may be made of a resin material such as silicone. The adhesive layers 37b may be made of an acrylic resin material. The substrate 37a serves to hold an urging force acting on the upper base member 36 from the cover 21.

For example, assume that an application software is to be booted up based on the input manipulation of the touch screen panel unit 22. An icon representing the application software is displayed on the screen of the LCD panel inside the window opening 18. The position of the icon is determined based on the x- and y-coordinate.

Now, if the user touches the upper base member 36 of the touch screen panel unit 22 at the icon, the upper base member 36 deforms at the corresponding touch position. The deformation of the upper base member 36 causes the second electrically conductive film 48 on the upper base member 36 to contact the first electrically conductive film 38 on the lower base member 35. An electric potential gradient is induced in the second electrically conductive film 48 on the upper base member 36, so that the x-coordinate of the touch position can be determined. Voltage is applied to the second electrically conductive film 48 through the electrically conductive lines 47, the second electrically conductive line 52a, 52b and the second electrode 51a, 51b. The electric potential of the touch position is taken out from the first electrically conductive film 38. The electric potential of the touch position is utilized to determine the x-coordinate.

An electric potential gradient is likewise induced in the first electrically conductive film 38 on the lower base member 35, so that the y-coordinate of the touch position can be determined. Voltage is applied to the first electrically conductive film 38 through the first electrically conductive line 43a, 43b and the first electrode 42a, 42b. The electric potential of the touch position is taken out from the second electrically conductive film 48. The electric potential of the touch position is utilized to determine the y-coordinate. The x- and y-coordinates are supplied to the CPU. The CPU observes the relationship between the x- and y-coordinates and the aforementioned x- and y-coordinates. If the correspondence is confirmed, the CPU operates to boot the application software.

Next, a brief explanation will be made on a method of making the touch screen panel unit 22. The lower and upper base members 35, 36 are first separately prepared. The first and second electrically conductive films 38, 48 have been evaporated on the lower and upper base members 35, 36, respectively. The first electrically conductive body 41 is then formed on the lower base member 35 along the periphery. The second electrically conductive body 49 is formed on the upper base member 36 along the periphery. In this case, silver or copper paste is first printed on a predetermined substrate in patterns corresponding to the electrodes and the electrically conductive lines. The first electrically conductive line 43a and the second electrode 51a may be shaped in a meander. The silver or copper paste gets hardened based on an applied heat. The patterned electrodes and electrically conductive lines are then transferred from the substrate to the lower and upper base members 35, 36 at predetermined positions. The dot spacers 39 are formed on the upper surface of the first electrically conductive film 38. A resin material may be applied to predetermined positions to establish the individual dot spacers 39, for example. The adhesive material 37 is thereafter interposed between the lower and upper base members 35, 36. The upper base member 36 is in this way coupled to the lower base member 35.

A user of the notebook personal computer 11 often grasps the periphery of the display apparatus 14. A larger urging force is applied to the upper base member 36 from the cover 21. The urging force acts on the first electrically conductive line 43a and the second electrode 51a. Since the lap is reduced between the first electrically conductive line 43a and the second electrode 51a, any contact is to the utmost prevented between the first electrically conductive line 43a and the second electrode 51a. The touch screen panel unit 22 keeps normally operating.

In addition, when the urging force is received on the upper base member 36 from the cover 21, the second electrode 51a is urged toward the first electrically conductive line 43a. The second electrode 51 and the first electrically conductive line 43a are set symmetric relative to the straight line connecting the starting points 44, 54 and the end points 45, 55, so that a lateral shift can be prevented between the second electrode 51 and the first electrically conductive line 43a along the surface of the upper and lower base members 35, 36.

The touch screen panel unit 22 may be employed not only in the notebook personal computer 11 but also in any type of electronic apparatus such as a personal digital assistance (PDA), a point-of-sales (POS) terminal, a global positioning system (GPS) terminal, a facsimile machine, a copying machine, a car navigation system, and the like.

What is claimed is:

1. A panel unit, comprising:
  a lower base member;
  a first electrically conductive stripe extending from a starting point to an end point on a front surface of the lower base member, said first electrically conductive stripe serpentining on the front surface of the lower base member;
  an upper base member opposing its back surface to the front surface of the lower base member; and
  a second electrically conductive stripe extending on the back surface of the upper base member from a corresponding starting point opposed to the starting point to a corresponding end point opposed to the end point, said second electrically conductive stripe serpentining on the back surface of the upper base member so as to intersect across the first electrically conductive stripe two or more times.

2. The panel unit according to claim 1, wherein said lower and upper base members have permeability of light.

3. The panel unit according to claim 1, further comprising:
a frame member received on the front surface of the upper base member, said frame member defining window opening along the front surface of the upper base member; and
an insulator layer interposed between the first and second electrically conductive stripes, said insulator layer receiving an urging force acting on the upper base member from the frame member.

4. A panel unit, comprising:
a first base member;
an electrically conductive film extending on a front surface of the first base member between a pair of electrodes;
an electrically conductive line connected to at least one of the electrodes, said electrically conductive line extending from a starting point to an end point on the front surface of the first base member at a location spaced from the electrically conductive film, said electrically conductive line serpentining on the front surface of the first base member;
a second base member opposing a back surface to the front surface of the first base member; and
an electrically conductive stripe extending on the back surface of the second base member from a corresponding starting point opposed to the starting point to a corresponding end point opposed to the end point, said electrically conductive stripe serpentining on the back surface of the second base member so as to intersect across the electrically conductive line two or more times.

5. The panel unit according to claim 4, further comprising an electrically conductive film extending on the back surface of the second base member, wherein said electrically conductive stripe is an electrode connected to the electrically conductive film extending on the back surface of the second base member, said electrically conductive film being opposed to the electrically conductive film on the first base member.

6. A display apparatus comprising:
a display panel unit;
a lower base member disposed along a front surface of the display panel unit;
a first electrically conductive stripe extending from a starting point to an end point on a front surface of the lower base member, said first electrically conductive stripe serpentining on the front surface of the lower base member;
an upper base member opposing a back surface to the front surface of the lower base member; and
a second electrically conductive stripe extending on the back surface of the upper base member from a corresponding starting point opposed to the starting point to a corresponding end point opposed to the end point, said second electrically conductive stripe serpentining on the back surface of the upper base member so as to intersect across the first electrically conductive stripe two or more times.

7. The display apparatus according to claim 6, wherein said lower and upper base members have permeability of light.

8. The display apparatus according to claim 6, further comprising:
a frame member received on a front surface of the upper base member, said frame member defining a window opening along the front surface of the upper base member; and
an insulator layer interposed between the first and second electrically conductive stripes, said insulating layer receiving an urging force acting on the upper base member from the frame member.

9. A display apparatus comprising:
a display panel unit;
a first base member disposed along a front surface of the display panel unit;
an electrically conductive film extending on a front surface of the first base member between a pair of electrodes;
an electrically conductive line connected to at least one of the electrodes, said electrically conductive line extending from a starting point to an end point on the front surface of the first base member at a location spaced from the electrically conductive film, said electrically conductive line serpentining on the front surface of the first base member;
a second base member opposing a back surface on the front surface of the first base member; and
an electrically conductive stripe extending on the back surface of the second base member from a corresponding starting point opposed to the starting point to a corresponding end point opposed to the end point, said electrically conductive stripe serpentining on the back surface of the second base member so as to intersect across the electrically conductive line two or more times.

10. The display apparatus according to claim 9, further comprising an electrically conductive film extending on the back surface of the second base member, wherein said electrically conductive stripe is an electrode connected to the electrically conductive film extending on the back surface of the second base member, said electrically conductive film being opposed to the electrically conductive film on the first base member.

11. An electronic apparatus comprising:
a display panel unit;
a lower base member disposed along a front surface of the display panel unit;
a first electrically conductive stripe extending from a starting point to an end point on a front surface of the lower base member, said first electrically conductive stripe serpentining on the front surface of the lower base member;
an upper base member opposing a back surface to the front surface of the lower base member; and
a second electrically conductive stripe extending on the back surface of the upper base member from a corresponding starting point opposed to the starting point to a corresponding and point opposed to the end point, said second electrically conductive stripe serpentining on the back surface of the upper base member so as to intersect across the first electrically conductive stripe two or more times.

12. The electronic apparatus according to claim 11, wherein said lower and upper base members having permeability of light.

13. The electronic apparatus according to claim 11, further comprising:

a frame member received on a front surface of the upper base member, said frame member defining a window opening along a front surface of the upper base member; and an insulator layer interposed between the first and second electrically conductive stripe, said insulator layer receiving an urging force acting on the upper base member from the frame member.

14. An electronic apparatus comprising:

a display panel unit;

a first base member disposed along a front surface of the display panel unit;

an electrically conductive film extending on a front surface of the first base member between a pair of electrodes;

an electrically conductive line connected to at least one of the electrodes, said electrically conductive line extending from a starting point to an end point on the front surface of the first base member at a location spaced from the electrically conductive film, said electrically conductive line serpentining on the front surface of the first base member;

a second bas member opposing a back surface to the front surface of the first base member; and an electrically conductive stripe extending on the back surface of the second base member from a corresponding starting point opposed to the starting point to a corresponding end point opposed to the end point, said electrically conductive stripe serpentining on the back surface of the second base member so as to intersect across the electrically conductive line two or more times.

15. The electronic apparatus according to claim 14, further comprising an electrically conductive film extending on the back surface of the second base member, wherein said electrically conductive stripe is an electrode connected to the electrically conductive film extending on the back surface of the second base member, said electrically conductive film being opposed to the electrically conductive film on the first base member.

* * * * *